Aug. 13, 1935.                W. F. HEINEMAN                2,010,952
              METHOD AND APPARATUS FOR ELECTRIC FLASH WELDING
                            Filed July 3, 1933
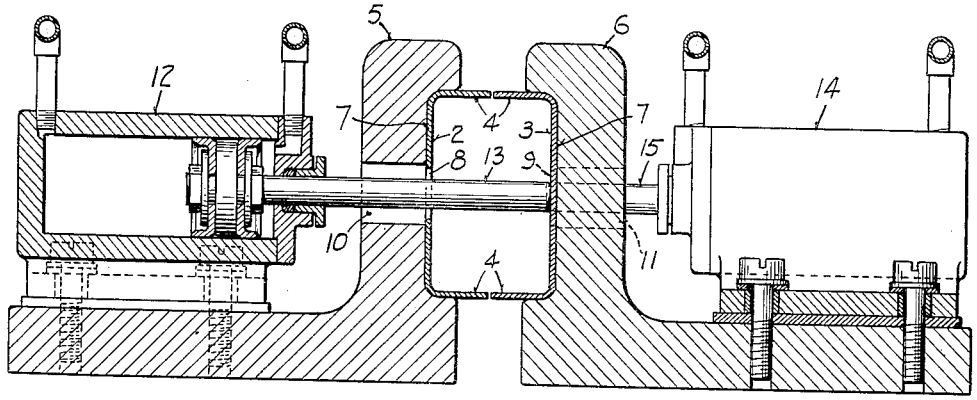
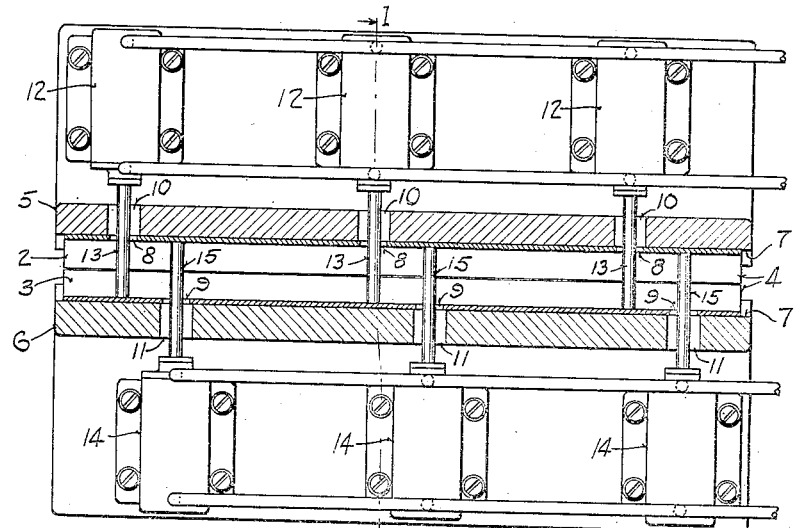
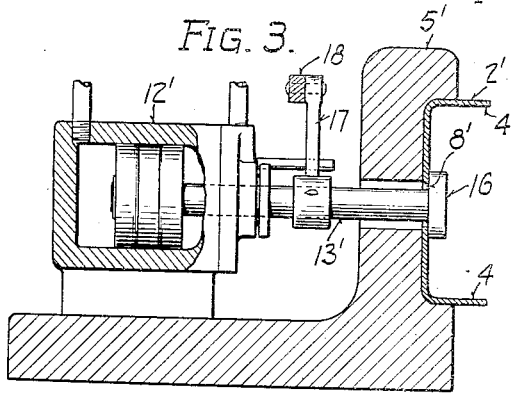
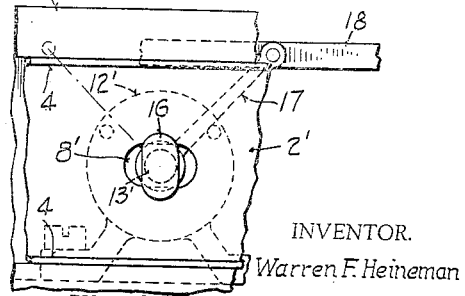
INVENTOR.
Warren F. Heineman
BY
ATTORNEY.

Patented Aug. 13, 1935

2,010,952

UNITED STATES PATENT OFFICE 2,010,952

METHOD AND APPARATUS FOR ELECTRIC FLASH WELDING

Warren F. Heineman, Shorewood, Wis., assignor to A. O. Smith Corporation, Milwaukee, Wis., a corporation of New York Application July 3, 1933, Serial No. 678,752

8 Claims. (Cl. 219—17)

This invention relates to a method and apparatus for electric flash welding.

The object of the invention is to facilitate holding of the blanks to be welded in opposed position during welding and to prevent their displacement from the electrodes.

The accompanying drawing illustrates an apparatus made in accordance with the invention.

Figure 1 of the drawing is a transverse section of the apparatus taken on the line 1—1 of Fig. 2, showing the electrodes, blanks and clamping means.

Fig. 2 is a plan view partly in section.

Fig. 3 is a transverse section showing a modified construction.

Fig. 4 is a partial side view of the modified construction.

The invention is illustrated as applied to the fabrication of a bar of rectangular cross section from two channel-shaped members 2 and 3 by flash welding the respective edges of the flanges 4 of the channels together.

The welding is accomplished by placing the parts 2 and 3 in a suitable welding machine, only a portion of which is illustrated in the drawing. The welding machine has a pair of spaced electrodes 5 and 6 of a length and width designed to accommodate the parts to be welded.

Each of the electrodes 5 and 6 has a recess 7 in its face of a shape to receive one of the channel members 2 or 3 in close fitting engagement to the electrode.

The electrodes 5 and 6 are arranged in opposed relation so as to properly present the parts to one another for welding, and are connected to a suitable source of welding current, not shown, and to suitable power mechanism, not shown, for moving the electrodes relative to one another to effect the welding of the parts.

In flash welding such parts together the edge portions of the channel members 2 and 3 become heated to welding temperature while the body portion is relatively cool. This tends to warp the channel member outwardly and to expel it from the electrode at the center, resulting in improper electrical contact of the members with their respective electrodes and also misalignment of the edges for flashing.

In order to insure that the members 2 and 3 are retained in the recesses 7 of the electrodes 5 and 6 without displacement, the present invention provides openings 8 in the base of channel member 2 and similar openings 9 in the base of channel member 3. The openings 8 and 9 are dissimilarly located, that is, they are preferably positioned so as to be out of alignment in the completed bar, as illustrated in the drawing.

The electrode 5 is provided with openings 10 positioned to be in alignment with the openings 8 in the member 2 when the latter is positioned in the recess 7 of electrode 5. Similarly, electrode 6 is provided with openings 11 located to be in alignment with the openings 9 in the member 3 when the latter is positioned in the recess 7 of electrode 6.

Fluid pressure cylinders 12 are attached to the electrode 5 or to its base, in alignment with the openings 8 in the channel member 2 when the channel member is seated in the recess 7 of the electrode 5. The cylinders 12 operate push rods 13 which, during the welding operation, extend through the openings 8 and engage the back wall of the channel member 3, holding the latter in place in the recess 7 of electrode 6.

Similarly, fluid pressure cylinders 14 are attached to the electrode 6 or to its base, in alignment with the openings 9 in the channel member 3 when the channel member is seated in the recess 7 of the electrode 6. The cylinders 14 operate push rods 15 which, during the welding operation, extend through the openings 9 and engage the back wall of the channel member 2, holding the latter in place in the recess 7 of electrode 5.

During the welding operation, the fluid pressure in the cylinders 12 and 14 is made to accommodate the relative movement of the electrodes 5 and 6, allowing the retraction of the push rods 13 and 15 as the electrodes are made to approach each other.

When the weld is completed, the push rods 13 and 15 are fully retracted to allow removal of the cross bar and insertion of new channel members to be welded.

The cylinders 12 and 14 may be mounted in stationary bases instead of on the electrodes, in which case the retraction of the push rods 13 and 15, during welding, will be less.

As many cylinders and push rods may be provided along the electrodes as may be desired. In some cases, one such device on each side may be sufficient. Where more than one is employed on each side, the openings 8 and 9 in the channel member may be staggered in respect to each other either longitudinally or in any suitable manner to allow the push rod passing through each opening to engage the opposite wall.

The cylinders 12 and 14 may be operated by any suitable fluid pressure means and are preferably controlled in synchronism with, and in some cases, automatically as a part of the welding cycle.

The modification shown in Figs. 3 and 4 may be employed where it is desirable to have the openings in the two channel members in alignment and it is, therefore, impractical to have the push rods press against the opposite wall of the article being welded. In this case, the rods 13' become pull rods instead of push rods.

Each rod 13' has a head 16 of eccentric shape on its end. The rod is mounted for rotation by means of a hand lever 17, which may be connected to an actuating rod 18 for rotating all of the pull rods 13' at one time.

The shape and size of the opening 8' is preferably such that the head 16 of rod 13' will pass through the opening without difficulty and then, when the rod and head are rotated, the head will prevent retraction through the opening. After the head has been rotated in clamping position, as shown, the cylinder 12' is operated to clamp the blank 2' against the electrode 5'.

Various modifications of the device may be employed without departing from the scope of the invention as expressed in the accompanying claims.

I claim:

1. In electric flash welding a tubular beam structure from a plurality of longitudinal sections and in which the respective sections to be welded are positioned in recessed electrodes with their respective longitudinal edges in juxtaposition for welding, the method of retaining the sections from displacement in the electrodes during welding comprising, providing openings in the walls of the sections and corresponding openings through the electrodes, and applying forces through said openings, but not reacting with said electrode openings, against the sections to hold said sections in their respective recesses of the electrodes.

2. In electric flash welding a tubular beam structure from a plurality of longitudinal sections and in which the respective sections to be welded are positioned in recessed electrodes with their respective longitudinal edges in juxtaposition for welding, the method of retaining the sections from displacement in the electrodes during welding, comprising providing openings in the walls of the sections, the openings in the opposing sections being out of alignment, and applying pressure by means of rods extending through an opening in each section against the opposite wall of the opposing section to hold the latter section in position in the recessed electrode.

3. In an electric flash welding machine, a pair of opposing electrodes having recessed faces for receiving the sections of the article to be welded and having openings therethrough, and externally operative reciprocative means extending through said openings and through similarly located openings in sections of the article being welded for holding the sections of the article to be welded against the recessed faces of the electrodes and reciprocating means to rotate said first named means to effect its engagement with the article to be held.

4. In an electric flash welding machine, a pair of opposed electrodes having recessed faces for receiving the sections of the article to be welded, said electrodes having openings therethrough, means extending through said openings and through similarly located openings in sections of the article being welded for holding the sections of the article to be welded against the recessed faces of the electrodes, and fluid pressure means positioned without said electrodes and said article for extending and retracting said holding means through said openings in synchronism with the welding cycle.

5. In an electric flash welding machine, in combination with a pair of opposed electrodes having openings therethrough, means extending through the openings in the electrodes and through similar openings in sections of the article being welded, said means being in pressure engagement with the walls of the opposing sections to hold the same against the respective electrodes, and means for applying pressure to said first named means and for retracting the same from the article after a weld is completed.

6. In an electric flash welding machine, a pair of opposed electrodes, one of said electrodes having an opening therethrough, a push rod extending through said opening and through a similar opening aligned therewith in the section of the article being welded in engagement with said electrode, said push rod being in pressure engagement with the other section of the article to hold the same against the face of the opposing electrode, and means for operating said push rod relatively into and out of engagement with the article.

7. In an electric flash welding machine, in combination with a pair of opposed electrodes having openings therethrough, fluid pressure cylinders arranged in alignment with said openings, and push rods attached to the pistons of said cylinders and adapted to be extended through said openings in the electrodes and through corresponding openings in the sections of the article being welded, said push rods being operable into engagement with the wall of the opposing section of the article to hold the same in position during welding.

8. In an electric flash welding machine, in combination with an electrode having an opening therethrough, means extending through said opening in the electrode and through a similar opening in a section of the article being welded for clamping the section to the electrode, and means separated from said section of the article by said electrode for applying clamping pressure to said first named means during welding and for retracting the same from the article after a weld is completed, said second means including transverse oscillating means adapted to place said first named means in position for clamping and release of the article when oscillated forward and back respectivey.

WARREN F. HEINEMAN.